(12) United States Patent
Sugiura et al.

(10) Patent No.: US 7,381,670 B2
(45) Date of Patent: Jun. 3, 2008

(54) MATERIAL FOR MAGNETIC HEAD SLIDER, MAGNETIC HEAD SLIDER, AND METHOD OF PRODUCING MATERIAL FOR MAGNETIC HEAD SLIDER

(75) Inventors: Kei Sugiura, Tokyo (JP); Yukio Kawaguchi, Tokyo (JP); Atsushi Hitomi, Tokyo (JP)

(73) Assignee: TDK Corporation, Tokyo (JP)

( * ) Notice: Subject to any disclaimer, the term of this patent is extended or adjusted under 35 U.S.C. 154(b) by 121 days.

(21) Appl. No.: 11/429,221

(22) Filed: May 8, 2006

(65) Prior Publication Data

US 2006/0293166 A1    Dec. 28, 2006

(30) Foreign Application Priority Data

Jun. 27, 2005    (JP)    ............................. 2005-186679

(51) Int. Cl.
   *C04B 35/117* (2006.01)
   *C04B 35/56* (2006.01)
   *G11B 5/60* (2006.01)
(52) U.S. Cl. .................. 501/87; 501/127; 428/813; 360/235.1
(58) Field of Classification Search ................. 501/87, 501/127; 428/813; 360/325.1
   See application file for complete search history.

(56) References Cited

U.S. PATENT DOCUMENTS

| 4,251,841 | A | * | 2/1981 | Jacobs | .................... 360/235.1 |
| 4,650,774 | A | * | 3/1987 | Kawaguchi et al. | .......... 501/87 |
| 4,902,651 | A | * | 2/1990 | Wada et al. | .................. 501/87 |
| 7,196,028 | B2 | * | 3/2007 | Ujita et al. | ................. 501/127 |
| 2005/0259363 | A1 | * | 11/2005 | Kawaguchi et al. | ..... 360/235.1 |
| 2006/0002027 | A1 | * | 1/2006 | Kawaguchi et al. | ..... 360/235.1 |
| 2006/0293167 | A1 | * | 12/2006 | Hitomi et al. | ............. 501/127 |
| 2007/0127159 | A1 | * | 6/2007 | Sugiura et al. | ......... 360/235.3 |
| 2007/0153421 | A1 | * | 7/2007 | Sugiura et al. | ......... 360/235.3 |

FOREIGN PATENT DOCUMENTS

JP    A 57-82172    5/1982

* cited by examiner

*Primary Examiner*—Karl E Group
(74) *Attorney, Agent, or Firm*—Oliff & Berridge, PLC (57) ABSTRACT

A material for a magnetic head slider according to the present invention is a magnetic head slider material comprised of a sintered body containing alumina and titanium carbide, in which an area percentage of an area of alumina crystal grains and titanium carbide crystal grains having a crystal grain size of not less than 200 nm nor more than 350 nm to an area of alumina crystal grains and titanium carbide crystal grains in a cut surface of the sintered body is not less than 80%.

6 Claims, 6 Drawing Sheets

MATERIAL FOR MAGNETIC HEAD SLIDER, MAGNETIC HEAD SLIDER, AND METHOD OF PRODUCING MATERIAL FOR MAGNETIC HEAD SLIDER

BACKGROUND OF THE INVENTION

1. Field of the Invention

The present invention relates to a material for a magnetic head slider, the magnetic head slider, and a method of producing the material for the magnetic head slider.

2. Related Background Art

A magnetic head slider incorporating a thin-film magnetic head was first used in a hard disk drive in 1979, and the magnetic head slider at that time is commonly called a mini slider (100% slider). The magnetic head sliders have been downsized through a micro slider (70% slider) having the size of about 70% of the mini slider to a nano slider (50% slider) having the size of about 50% of the mini slider.

Such magnetic head sliders are normally constructed with a laminate incorporating a thin-film magnetic head on a substrate. The magnetic head sliders of this type are obtained by laying the laminate incorporating the thin-film magnetic head, on the substrate to form a laminated structure, thereafter cutting this laminated structure in parallel with the stack direction to form an exposed surface of the thin-film magnetic head, and lapping (or polishing) the exposed surface to form an air bearing surface.

In the production of the conventional magnetic head sliders, for example, as described in Patent Document 1 below, a high-strength sintered body consisting primarily of alumina and titanium carbide, so called an AlTiC sintered body, is used as the substrate of the magnetic head slider.

[Patent Document 1] Japanese Patent Application Laid-Open No. SHO 57-82172

SUMMARY OF THE INVENTION

Incidentally, the magnetic head slider called a pico slider (30% slider) having the size of about 30% of the mini slider is presently mainstream, and it is anticipated that the magnetic head slider will be further downsized with reduction of size and cost of the hard disk drive and that the magnetic head slider will shift to a femto slider (20% slider) having the size of about 20% of the mini slider.

With such downsizing of the magnetic head slider, there arises a demand for reduction in a level difference of the air bearing surface due to a difference of polishing amounts between the substrate and the laminate laid on the substrate, in the lapping step for forming the air bearing surface.

However, the AlTiC sintered body used as the substrate of the conventional magnetic head sliders including the one described in the aforementioned Patent Document 1 has a polishing rate extremely lower than that of the laminate incorporating the thin-film magnetic head, and this poses a problem that in the lapping step the polishing amount of the laminate is much larger than that of the substrate to cause a large level difference.

The present invention has been accomplished in light of the above circumstances, and an object of the present invention is to provide a material for a magnetic head slider permitting reduction in the level difference of the air bearing surface and having sufficient strength, the magnetic head slider using it, and a method of producing the material for the magnetic head slider.

The Inventors developed a production method of a specific AlTiC sintered body in a process of developing a new AlTiC sintered body and found that an AlTiC sintered body of a crystal structure that has not fully been studied because of unestablishment of a production process thereof was excellent both in mechanical strength and in machinability.

In order to solve the aforementioned problem, the Inventors conducted further detailed study on the basis of the above finding and discovered that a sintered body containing a specific percentage of alumina crystal grains and titanium carbide crystal grains having a specific crystal grain size had sufficient strength and a sufficiently high polishing rate, thereby accomplishing the present invention.

Namely, a magnetic head slider material according to the present invention is a material for a magnetic head slider, comprising a sintered body containing alumina and titanium carbide, wherein an area percentage of an area of alumina crystal grains and titanium carbide crystal grains having a crystal grain size of not less than 200 nm nor more than 350 nm to an area of alumina crystal grains and titanium carbide crystal grains in a cut surface of the sintered body is not less than 80%.

The "crystal grain size" herein means an equivalent circle particle diameter of a circle assumed to have the same area.

Since the material for the magnetic head slider according to the present invention has the foregoing configuration, it has sufficient strength and permits an increase of the polishing rate as compared with the AlTiC sintered body used for the conventional materials for the magnetic head slider, so that the difference between the polishing rate of the substrate using this magnetic head slider material and the polishing rate of the laminate incorporating the thin-film magnetic head can be much smaller than before. This makes the level difference less likely to appear between the laminate and the substrate in the air bearing surface formed by lapping in production of the magnetic head slider, specifically, in production of the magnetic head slider by laying the laminate incorporating the thin-film magnetic head on the substrate made of this magnetic head slider material to obtain the laminated structure, and lapping a cross section parallel to the stack direction in this laminated structure.

The reason why the magnetic head slider material of the present invention has the sufficient strength and permits the high polishing rate is not quite clear, but the inventors reason as follows. Namely, in the foregoing sintered body the crystal grain size of the alumina crystal grains and titanium carbide crystal grains making the sintered body is extremely small and variation thereof is small. On the other hand, the average grain size of abrasive grains used in the polishing is 0.05-0.25 µm, and lengths of cracks in the sintered body made during collision between the abrasive grains and the crystal grains of the sintered body are comparable to the size of the abrasive grains. It is thus inferred that energy is efficiently given to the sintered body in the polishing process. We deduce that it results in providing the sintered body with sufficient strength and promotes smooth delamination between crystal grains of nanometer order during machining to achieve an increase in the polishing rate.

In the material for the magnetic head slider according to the present invention, preferably, the sintered body further contains carbon. When the sintered body contains carbon, it becomes feasible to achieve higher levels of the mechanical strength and polishing rate of the material together. Namely, it becomes feasible to further increase the polishing rate while securing sufficient strength of the material for the magnetic head slider, to further enhance the strength while securing a sufficient polishing rate, or to further enhance the both. A conceivable reason for achievement of this effect is that the amount of carbon (carbon concentration) to an area of an interface at a crystal grain boundary is optimized, so as to further lower delamination strength of crystal grains in nanometer order, while maintaining mechanical strength.

Furthermore, preferably, a content of the carbon is 0.4-3.0 parts by mass, where a total mass of the alumina, titanium carbide, and carbon is 100 parts by mass. When the material contains carbon in the foregoing range, it becomes feasible to more securely achieve high levels of the mechanical strength and polishing rate of the material together.

Preferably, the sintered body has a thin film containing carbon, at a grain boundary between the alumina crystal grains. This makes it feasible to achieve higher levels of the mechanical strength and polishing rate of the material together. The reason why this effect is achieved is not quite clear, but it is considered that the thin film of carbon adequately suppresses growth of alumina crystal grains during the sintering and that it results in further increasing the content of alumina crystal grains having the crystal grain size of not less than 200 nm nor more than 350 nm and further decreasing the variation of grain size.

In the material for the magnetic head slider according to the present invention, preferably, the sintered body further contains titania. When the material for the magnetic head slider contains titania, it enhances sinterability and facilitates achievement of higher strength.

A magnetic head slider according to the present invention comprises a substrate made from the magnetic head slider material of the present invention described above, and a laminate formed on the substrate and incorporating a thin-film magnetic head.

Since the magnetic head slider of the present invention comprises the substrate made from the magnetic head slider material, the level difference becomes less likely to occur between the laminate and the substrate in the air bearing surface formed by lapping in production of the magnetic head slider, specifically, in production of the magnetic head slider by lapping the cross section parallel to the stack direction in the laminate, and it thus becomes easy to achieve downsizing of the magnetic head slider.

A production method of a material for a magnetic head slider according to the present invention is a method of producing a material for a magnetic head slider, comprising: a step of preparing a formed body containing alumina particles, titanium carbide particles, and carbon; and a sintering step of sintering the formed body in a non-oxidizing atmosphere and at a predetermined sintering temperature to produce a sintered body, wherein an average grain size of the alumina particles and the titanium carbide particles is not more than 0.35 μm and a content of the carbon is 0.4-3.0 parts by mass, where a total mass of the alumina particles, titanium carbide particles, and carbon is 100 parts by mass, and wherein in the sintering step, the sintering temperature is not less than 1650° C., and a temperature increase rate in temperature increase from 500° C. to the foregoing sintering temperature is not less than 5° C./min.

According to this production method, the formed body contains carbon in the foregoing content and the sintering step results in sintering the formed body while suppressing growth of grains of alumina and titanium carbide, whereby an area percentage of an area of alumina crystal grains and titanium carbide crystal grains having a crystal grain size of not less than 200 nm nor more than 350 nm to an area of alumina crystal grains and titanium carbide crystal grains in a cut surface of the sintered body can be not less than 80%. Then we can obtain the material for the magnetic head slider having sufficient strength and permitting an increase in the polishing rate.

Furthermore, preferably, in the sintering step the temperature increase rate in the temperature increase from 500° C. to the sintering temperature is not less than 10° C./min. When the formed body containing alumina, titanium carbide, and carbon is heated up under this condition, it becomes easy to sinter the formed body, while suppressing growth of grains of alumina and titanium carbide in the sintering step, and it becomes feasible to further increase the area percentage of the area of alumina crystal grains and titanium carbide crystal grains having the crystal grain size of not less than 200 nm nor more than 350 nm. This permits us to obtain the material for the magnetic head slider achieving much higher levels of the mechanical strength and polishing rate together.

In the sintering step, preferably, the sintering temperature is not less than 1680° C. When the formed body containing alumina, titanium carbide, and carbon is sintered under this condition, it becomes easy to sinter the formed body, while suppressing growth of grains of alumina and titanium carbide in the sintering step, and it becomes feasible to further increase the area percentage of the area of alumina crystal grains and titanium carbide crystal grains having the crystal grain size of not less than 200 nm nor more than 350 nm. This permits us to obtain the material for the magnetic head slider achieving much higher levels of the mechanical strength and polishing rate together.

In the production method of the magnetic head slider material according to the present invention, the step of preparing the formed body can be to mix a powder containing alumina, a powder containing titanium carbide, and a powder containing carbon to obtain a mixed powder and to shape this mixed powder.

The step of preparing the formed body can also be to mix a powder containing alumina, a powder containing titanium carbide, and an organic material to obtain a mixture, to thermally treat this mixture in a non-oxidizing atmosphere to carbonize the organic material in the mixture to obtain a mixed powder, and to shape this mixed powder.

The step of preparing the formed body can also be to mix a powder containing alumina, a powder containing titanium carbide, and an organic material to obtain a mixture, to shape this mixture, and to thermally treat the shaped mixture in a non-oxidizing atmosphere to carbonize the organic material in the mixture.

BRIEF DESCRIPTION OF THE DRAWINGS

FIGS. 5(*a*) and (*b*) in FIG. 5 are perspective views subsequent to FIG. 4 for explaining the production method of magnetic head sliders according to the embodiment of the present invention.

DESCRIPTION OF THE PREFERRED EMBODIMENTS

Preferred embodiments of the present invention will be described below in detail with reference to the accompanying drawings. In the description of the drawings identical or equivalent elements will be denoted by the same reference symbols, without redundant description. It is noted that dimensional ratios in each drawing do not always agree with actual dimensional ratios.

(Material for Magnetic Head Slider)

First, a material for a magnetic head slider according to the present embodiment will be described. The material for the magnetic head slider according to the present embodiment is a sintered body containing alumina ($Al_2O_3$) and titanium carbide (TiC). In the sintered body, alumina and titanium carbide form their respective crystal grains.

Here the sintered body needs to be one wherein the area percentage of the area of alumina crystal grains and titanium carbide crystal grains having the crystal grain size of not less than 200 nm nor more than 350 nm to the area of alumina crystal grains and titanium carbide crystal grains in a cut surface of the sintered body is not less than 80%. This enables the magnetic head slider material to have sufficient strength and a sufficiently high polishing rate. In the present specification the area percentage of the area of alumina crystal grains and titanium carbide crystal grains having the crystal grain size of not less than 200 nm nor more than 350 nm is determined by a method described below.

First, the sintered body is cut and an arbitrary range of the cut surface is observed with a scanning electron microscope "SS-550" (available from Shimadzu Corporation). Next, an image of the cut surface is processed to detect alumina crystal grains and titanium carbide crystal grains having the equivalent circle particle diameter of not less than 200 nm nor more than 350 nm. Then areas of those crystal grains are summed up. Then this sum is divided by the total area of the alumina crystal grains and titanium carbide crystal grains detected by the image processing, in the cut surface, to calculate the area percentage (%).

The content of titanium carbide in the material for the magnetic head slider according to the present embodiment is preferably 20-120 parts by mass, where the mass of alumina is 100 parts by mass. When the content of titanium carbide is determined in this range, it becomes easy to obtain the substrate for the magnetic head with sufficient strength and to reduce the electric resistance of the material to facilitate achievement of antistatic effect. If the concentration of titanium carbide is less than 20 parts by mass, rigidity tends to decrease to lower strength. On the other hand, if the concentration of titanium carbide is over 120 parts by mass, sinterability tends to degrade to lower strength.

In the present embodiment, the sintered body preferably contains carbon, in terms of achieving higher levels of the mechanical strength and polishing rate of the material together. Carbon in the sintered body is a free component not binding chemically to alumina and titanium carbide, and is present mainly at grain boundaries of alumina and titanium carbide.

When the sintered body contains carbon, a thin film containing carbon is preferably present at grain boundaries between alumina crystal grains. This makes it feasible to achieve much higher levels of the mechanical strength and polishing rate of the material together.

The content of carbon is preferably 0.4-3.0 parts by mass, where the total mass of alumina particles, titanium carbide particles, and carbon is 100 parts by mass.

When the content of carbon is in the foregoing range, it is feasible to more securely form the foregoing thin film containing carbon in the sintered body.

If the content of carbon is smaller than 0.4 part by mass, it tends to be difficult to achieve a sufficiently high polishing rate. On the other hand, if the content of carbon is over 3 parts by mass, the strength of the material tends to be too low, and thus it is not preferred.

The material for the magnetic head slider preferably further contains titania ($TiO_2$). A preferred content of titania is 0.5-10 parts by mass, where the mass of alumina is 100 parts by mass. When the material for the magnetic head slider contains titania, sinterability is enhanced to facilitate achievement of higher strength.

The material for the magnetic head slider according to the present embodiment may contain any other component as long as it does not affect characteristics.

(Structure of Material (Sintered Body) for Magnetic Head Slider)

Figure 1:
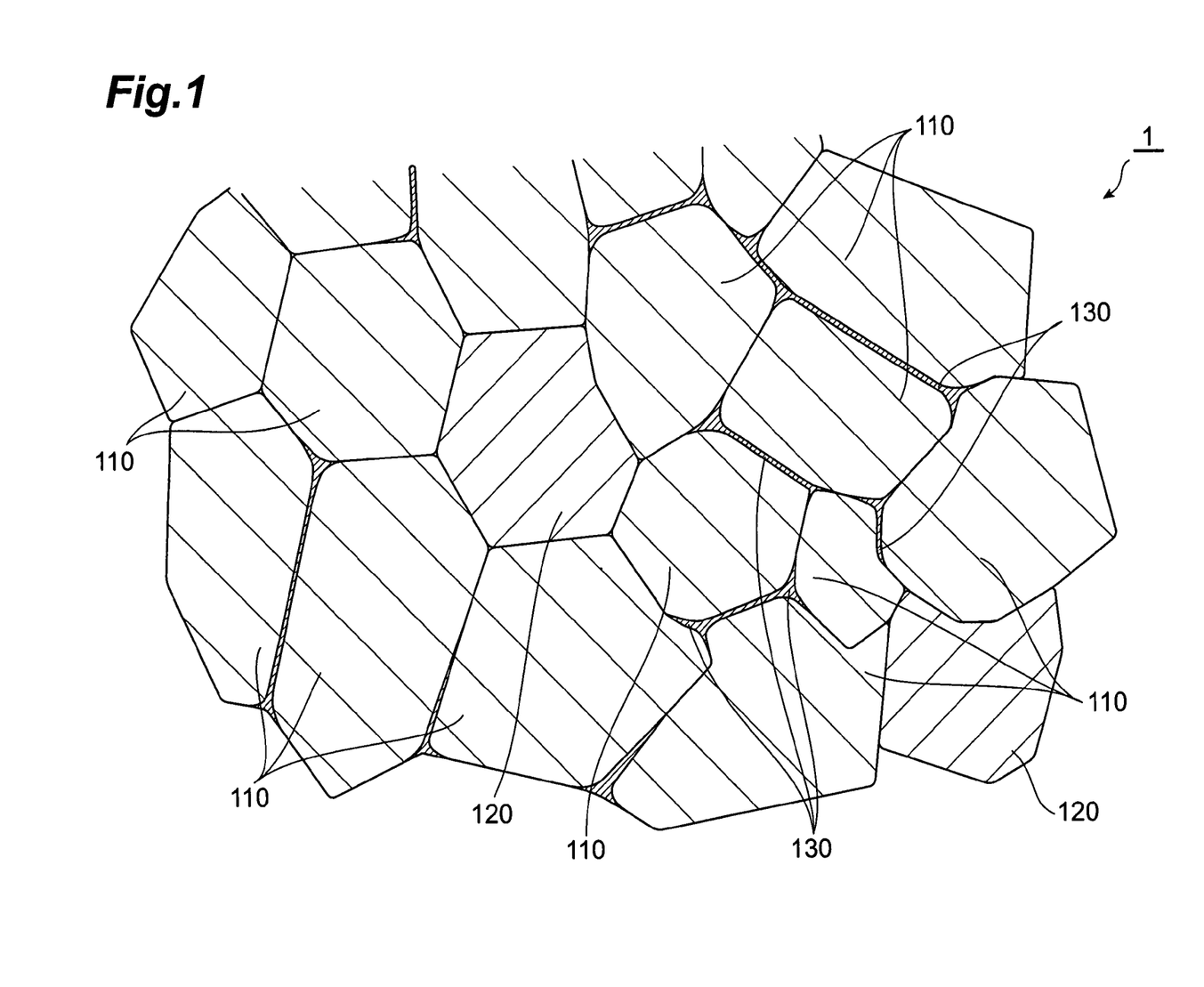
FIG. 1 is an example of a sectional view of a material (sintered body) for a magnetic head slider according to an embodiment of the present invention.

Among embodied forms of the sintered body according to the present invention described above, a structure of a sintered body which contains alumina, titanium carbide, and carbon and in which a thin film containing carbon is present at grain boundaries between alumina crystal grains will be described with reference to FIG. 1. FIG. 1 is a schematic sectional view of the sintered body 1 containing alumina, titanium carbide, and carbon according to the present embodiment. In the sintered body 1, as shown in FIG. 1, alumina forms alumina crystal grains 110, titanium carbide forms titanium carbide crystal grains 120, and thin films 130 containing carbon are present between alumina crystal grains 110.

In the thin films 130, an average thickness of portions between two alumina crystal grains 110, i.e., thickness A of thin films 130 is, for example, approximately 1-20 nm.

The molar concentration of carbon in the thin films differs depending upon the presence/absence of addition of titania, but it is preferably not less than 50%. As shown in FIG. 1, titanium carbide forms titanium carbide crystal grains 120, and titanium carbide also exists in the thin films 130.

(Production Methods of Material for Magnetic Head Slider)

Subsequently, production methods of the material for the magnetic head slider according to the present invention will be described. First, a first production method of the material for the magnetic head slider will be described.

The first step is to prepare an alumina powder, a titanium carbide powder, and a carbon powder and, if necessary, to further prepare a titania powder as an additive.

Here the average particle size of the alumina powder as a raw material needs to be not more than 0.35 μm and, preferably, 0.2-0.35 μm, from the viewpoint of keeping the grain sizes of the alumina crystal grains in the sintered body in the range of not less than 200 nm nor more than 350 nm.

The average particle size of the titanium carbide powder needs to be not more than 0.35 μm and, preferably, 0.2-0.35 μm, from the viewpoint of keeping the grain sizes of titanium carbide crystal grains in the sintered body in the range of not less than 250 nm nor more than 350 nm. The titanium carbide powder may contain carbon.

The average particle size of the carbon powder is preferably 10-100 nm. The carbon powder can be, for example, a powder made of carbon such as carbon black or ethylene black.

The average particle size of the titania powder is preferably 0.1-3 μm and more preferably 0.5-1 μm.

Then these powders are mixed, for example, in an organic solvent such as ethanol, IPA, or 95% denatured ethanol to obtain a mixed powder. If water were used as a solvent, the solvent would chemically react with titanium carbide to oxidize the titanium carbide powder. Therefore, water is not applicable.

The alumina powder, titanium carbide powder, and titania powder are blended in the mixed powder so that the masses of the titanium carbide powder and titania satisfy the respective aforementioned preferred conditions, where the total mass of alumina is 100 parts by mass, and the carbon powder is blended so that the content of carbon is 0.4-3.0 parts by mass, where the total mass of alumina particles, titanium carbide particles, and carbon is 100 parts by mass.

The blending of powders is preferably carried out in a ball mill or an attritor. The blending of powders is preferably carried out for about 10 to 100 hours. Mixing media in the ball mill or the attritor are preferably, for example, alumina balls or the like having the diameter of about 1-20 mm.

Next, the mixed powder is granulated by spray granulation. The granulation is effected herein by spray drying of the mixed powder in a hot blast of inert gas such as nitrogen or argon containing little oxygen, at about 60-200° C., and this obtains granules of the mixed powder in the above composition. Here the grain sizes of the granules are preferably, for example, about 50 μm-200 μm.

Next, if necessary, the foregoing organic solvent is added to adjust the content of liquid in the granules so that the organic solvent is contained in the content of about 0.1 to 10% by mass in the granules. The organic solvent used for adjustment of the content of liquid can be, for example, an organic solvent such as ethanol, IPA, or 95% denatured ethanol and is normally the organic solvent used in the blending of powders. If water were used as the solvent herein, the solvent would react chemically with titanium carbide to oxidize the titanium carbide powder. Therefore, water is not applicable.

Then the granules are packed in a predetermined die and primarily shaped by cold press to obtain a formed body. In this example, for example, the granules are filled in a metal or carbon die for formation of a disk having the inside diameter of 150 mm, and cold press is implemented, for example, under the pressure of about 5 to 15 MPa (about 50-150 kgf/cm$^2$).

Subsequently, the formed body thus obtained is hot pressed to obtain a sintered body.

The conditions for the hot press herein are the sintering temperature of not less than 1650° C. and the temperature increase rate of not less than 5° C./min in temperature increase from 500° C. to the sintering temperature. The other conditions include the pressure of 10-50 MPa (about 100-500 kgf/cm$^2$) and a non-oxidizing atmosphere such as vacuum, nitrogen, or argon. The non-oxidizing atmosphere is adopted in order to inhibit oxidation of titanium carbide. A carbon die is preferably used for shaping of the mixed powder. A sintering time of the formed body is preferably about 1 to 3 hours.

When the formed body obtained under the above conditions is hot pressed, the material for the magnetic head slider can be obtained as one wherein the area percentage of the area of alumina crystal grains and titanium carbide crystal grains having the crystal grain size of not less than 200 nm nor more than 350 nm to the area of alumina crystal grains and titanium carbide crystal grains in the cut surface of the sintered body is not less than 80%, and it has sufficient strength and permits an increase of the polishing rate.

In the present embodiment, the sintering temperature is preferably 1680 to 1700° C. The sintering at such temperature facilitates sintering of the formed body while suppressing growth of alumina and titanium carbide grains, and enables a further increase of the area percentage of the area of the alumina crystal grains and titanium carbide crystal grains having the crystal grain size of not less than 200 nm nor more than 350 nm. In addition, it is feasible to obtain a high-density sintered body. This permits us to obtain the material for the magnetic head slider achieving higher levels of the mechanical strength and polishing rate together.

Furthermore, in the present embodiment, the preferred condition for the hot press is that the temperature increase rate in the temperature increase from 500° C. to the sintering temperature is not less than 10° C./min. When the formed body is heated up under this condition, it becomes easy to sinter the formed body while suppressing growth of grains of alumina and titanium carbide, and it becomes feasible to further increase the area percentage of the area of the alumina crystal grains and titanium carbide crystal grains having the crystal grain size of not less than 200 nm nor more than 350 nm and to obtain a high-density sintered body. This permits us to obtain the material for the magnetic head slider achieving higher levels of the mechanical strength and polishing rate together.

After completion of the sintering, the sintered body stands to cool in a furnace, completing the material for the magnetic head slider. There are no particular restrictions herein on the shape of the material for the magnetic head slider, and it can be, for example, a substrate of a disk shape having the diameter of 6 inches and the thickness of 2.5 mm, or a rectangular substrate.

Subsequently, a second production method of the material for the magnetic head slider as described above will be described.

The first production method described above used the carbon powder, whereas the second production method uses an organic substance instead thereof. Specifically, first, an alumina powder, a titanium carbide powder, and an organic substance are mixed to obtain a mixture. There are no particular restrictions on the organic substance herein, but it can be, for example, polyvinyl alcohol, acrylic resin, butyral resin, or the like. The mixture may contain an additive such as titania powder according to need.

Subsequently, this mixture is thermally treated under a non-oxidizing atmosphere such as a vacuum atmosphere or a nitrogen atmosphere to carbonize the organic substance in the mixture. The carbonization conditions herein can be optionally and suitably set depending upon the type of the organic substance and others, and are, for example, a thermal treatment at 600° C. and for about 5 hours in a vacuum drying furnace or the like, which can obtain the mixed powder containing alumina, titanium carbide, and carbon and containing titania or the like according to need.

After that, this mixed powder is shaped and sintered in the same manner as in the first production method.

The production using the organic substance in this manner enables uniform dispersion of carbon and reduction in the time necessary for dispersion of carbon.

For obtaining a fine material for the magnetic head slider, it is preferable to shape the mixed powder after carbonization of the organic substance as described above, but the organic substance may be carbonized after the shaping. Specifically, after obtaining the mixture containing the alumina powder, titanium carbide powder, organic substance, and others, this mixture is shaped in the same manner as in the first production method, before the carbonization.

Then the formed body of the mixture containing this organic substance is subjected to the thermal treatment as described above, to carbonize the organic substance, thereby obtaining the formed body containing alumina, titanium carbide, carbon, and so on.

In the second production method, concentrations of the respective powders in mixing the alumina powder, titanium carbide powder, and the organic substance and further mixing the titania powder or the like according to need to obtain the mixture may be preliminarily determined so that the amounts of alumina, titanium carbide, carbon, and titania in the mixed powder or in the formed body after the carbonization of the mixture of those satisfy the concentrations defined in the first production method. This results in obtaining the formed body in the composition similar to that in the first production method.

(Magnetic Head Slider)

Next, a magnetic head slider using the material for the magnetic head slider will be described with reference to FIG. 2.

The magnetic head slider 11 of the present embodiment has a thin-film magnetic head 10, and is mounted on a hard disk drive (not shown) equipped with a hard disk. This hard disk drive is configured to record and reproduce magnetic information on a recording surface of the hard disk rotating at high speed, by the thin-film magnetic head 10.

The magnetic head slider 11 of the embodiment of the present invention is of an approximately rectangular parallelepiped shape. In FIG. 2, the surface on this side in the magnetic head slider 11 is a recording medium-opposed surface to be opposed to the recording surface of the hard disk, and is called an Air Bearing Surface (ABS) S. A groove 11a is formed in the direction perpendicular to the track width direction in the air bearing surface.

As the hard disk rotates, the magnetic head slider 11 comes to float by air flow caused by the rotation, whereby the air bearing surface S is set apart from the recording surface of the hard disk. The air bearing surface S may be provided with a coating of DLC (Diamond-Like Carbon) or the like.

This magnetic head slider 11 is comprised of a substrate 13 made of the aforementioned material for the magnetic head slider, and a laminate 14 formed on this substrate 13 and incorporating the thin-film magnetic head 10. More particularly, in the present embodiment the substrate 13 has a rectangular parallelepiped shape and the laminate 14 is formed on a side face of the substrate 13.

An upper surface 14a of the laminate 14 forms an end face of the magnetic head slider 11 and the upper surface 14a of the laminate 14 is equipped with record pads 18a, 18b and reproduction pads 19a, 19b connected to the thin-film magnetic head 10. The thin-film magnetic head 10 is provided in the laminate 14 and is exposed in part from the air bearing surface S to the outside. In FIG. 2, the thin-film magnetic head 10 buried in the laminate 14 is indicated by solid lines in consideration of easier recognition.

The magnetic head slider 11 of this configuration is mounted on a gimbal 12 and is connected to an unrepresented suspension arm to constitute a head gimbal assembly.

Figure 2:
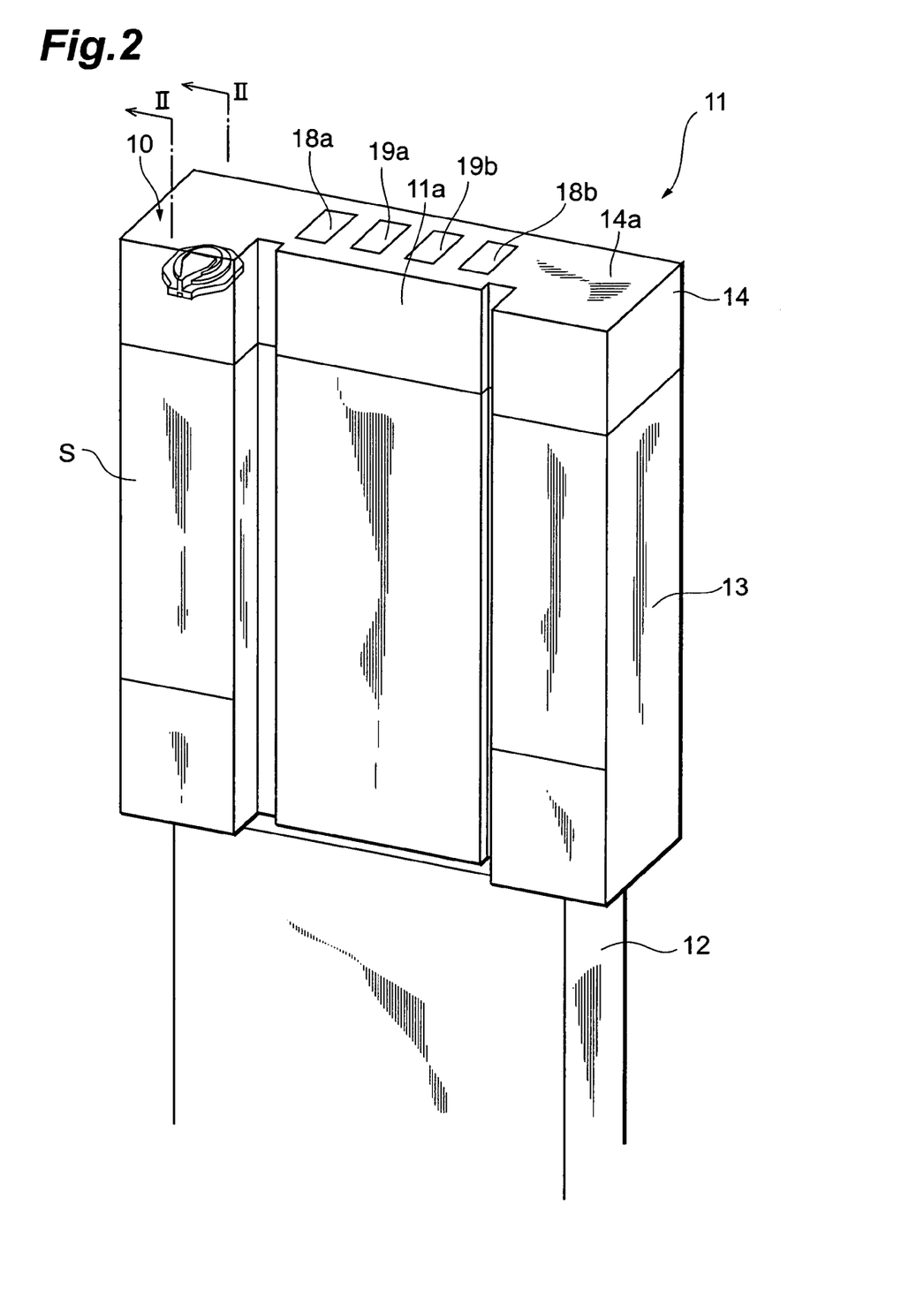
FIG. 2 is a perspective view of a magnetic head slider according to an embodiment of the present invention.
Figure 3:
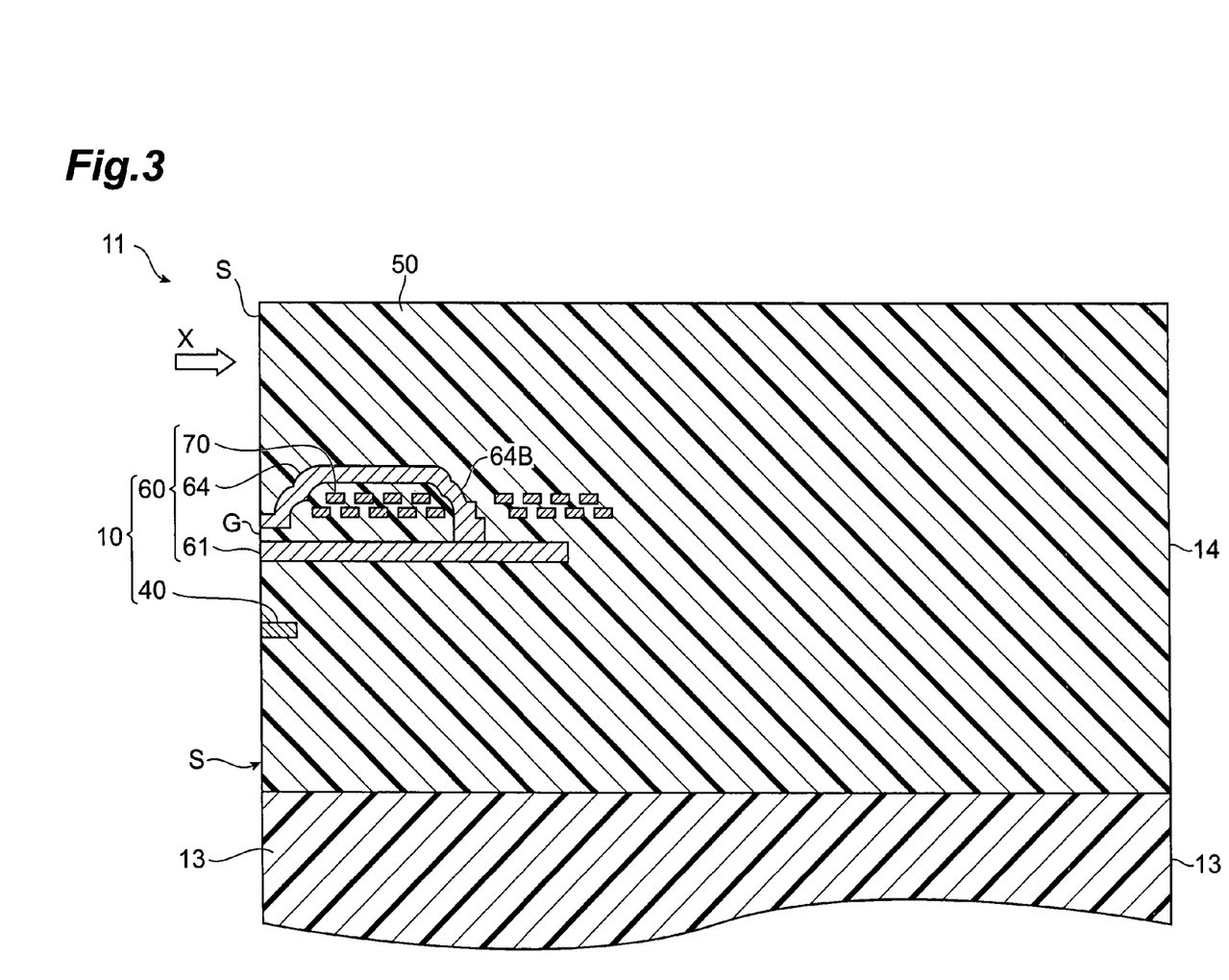
FIG. 3 is a view taken along II-II in the magnetic head slider of FIG. 2.

FIG. 3 is a schematic sectional view in a direction normal to the air bearing surface S and normal to the track width direction in the magnetic head slider 11 (a schematic sectional view along II-II in FIG. 2). As described above, the magnetic head slider 11 has the substrate 13 of the approximately rectangular plate shape, and the laminate 14 laid on the side face of this substrate 13. The laminate 14 has the thin-film magnetic head 10, and a coat layer 50 surrounding this thin-film magnetic head 10.

The thin-film magnetic head 10 has a GMR (Giant Magneto-Resistive) element 40 as a reading element for reading magnetic information on the hard disk, and an induction type electromagnetic conversion element 60 as a writing element for writing magnetic information on the hard disk, in order from the side close to the substrate 13, and is so called a composite thin-film magnetic head.

The electromagnetic conversion element 60 is one adopting the so-called longitudinal recording method, provided with a lower magnetic pole 61 and an upper magnetic pole 64 in order from the substrate 13 side, and further provided with a thin-film coil 70.

Ends of the lower magnetic pole 61 and the upper magnetic pole 64 on the air bearing surface S side are exposed in the air bearing surface S, and the exposed portions of the lower magnetic pole 61 and the upper magnetic pole 64 are spaced from each other by a predetermined distance to form a recording gap G. On the other hand, an end 64B of the upper magnetic pole 64 on the far side from the air bearing surface S is bent toward the lower magnetic pole 61, and this end 64B is magnetically coupled to an end of the lower magnetic pole 61 on the far side from the air bearing surface S. In this configuration, the upper magnetic pole 64 and the lower magnetic pole 61 form a magnetic circuit with the gap G in between.

The thin-film coil 70 is arranged to surround the end 64B of the upper magnetic pole 64 and is configured to generate a magnetic field in the recording gap G by electromagnetic induction, thereby recording magnetic information on the recording surface of the hard disk.

The GMR element 40 has a multilayer structure, though not shown, and is exposed in the air bearing surface S. The GMR element 40 is configured to detect a change of a magnetic field from the hard disk by making use of the magneto-resistance effect, to read the magnetic information.

The GMR element 40 and the electromagnetic conversion element 60 are spaced from each other by the insulating coat layer 50, and the upper magnetic pole 64 and the lower magnetic pole 61 are also spaced from each other by the insulating coat layer 50. The thin-film magnetic head 10 itself is also coated by the coat layer 50 except for the air bearing surface S. The coat layer 50 is made mainly of an insulating material such as alumina. Specifically, the coat layer is normally an alumina layer made by sputtering or the like. The alumina layer of this type normally has an amorphous structure.

The thin-film magnetic head 10 may be of the vertical recording method, instead of the longitudinal recording method. The GMR element 40 may be replaced by an AMR (Anisotropic Magneto-Resistive) element making use of the anisotropic magneto-resistance effect, a TMR (Tunnel-type Magneto-Resistive) element making use of the magneto-resistance effect occurring at a tunnel junction, or the like.

Furthermore, the coat layer 50 may further contain a magnetic layer or the like for electrically insulating the GMR element 40 from the electromagnetic conversion element 60.

Subsequently, a production method of the magnetic head slider 11 as described above will be described.

Figure 4:
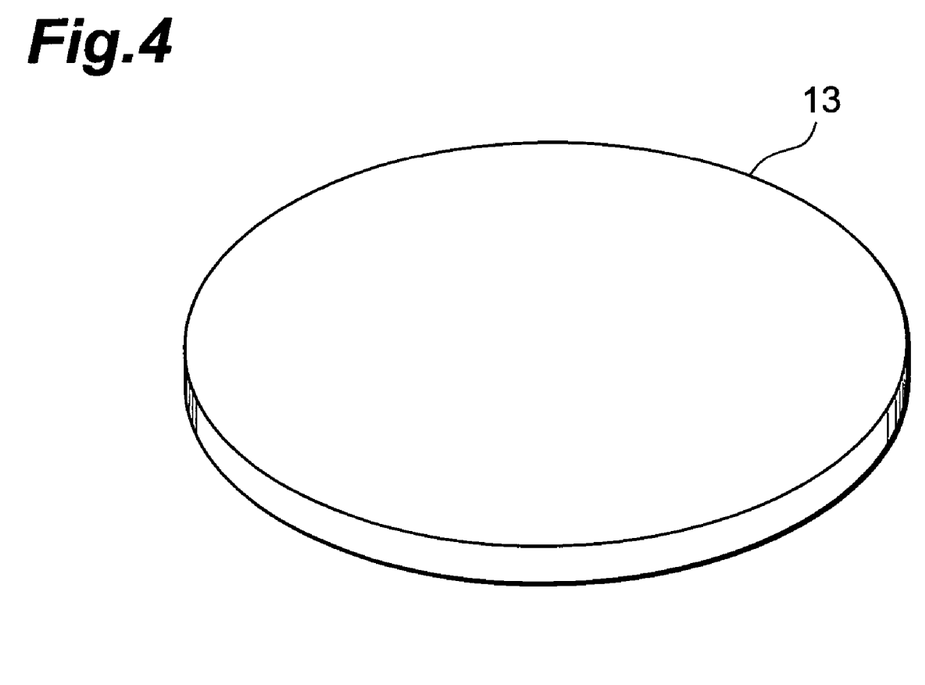
FIG. 4 is a perspective view for explaining a production method of magnetic head sliders according to an embodiment of the present invention.
Figure 5:
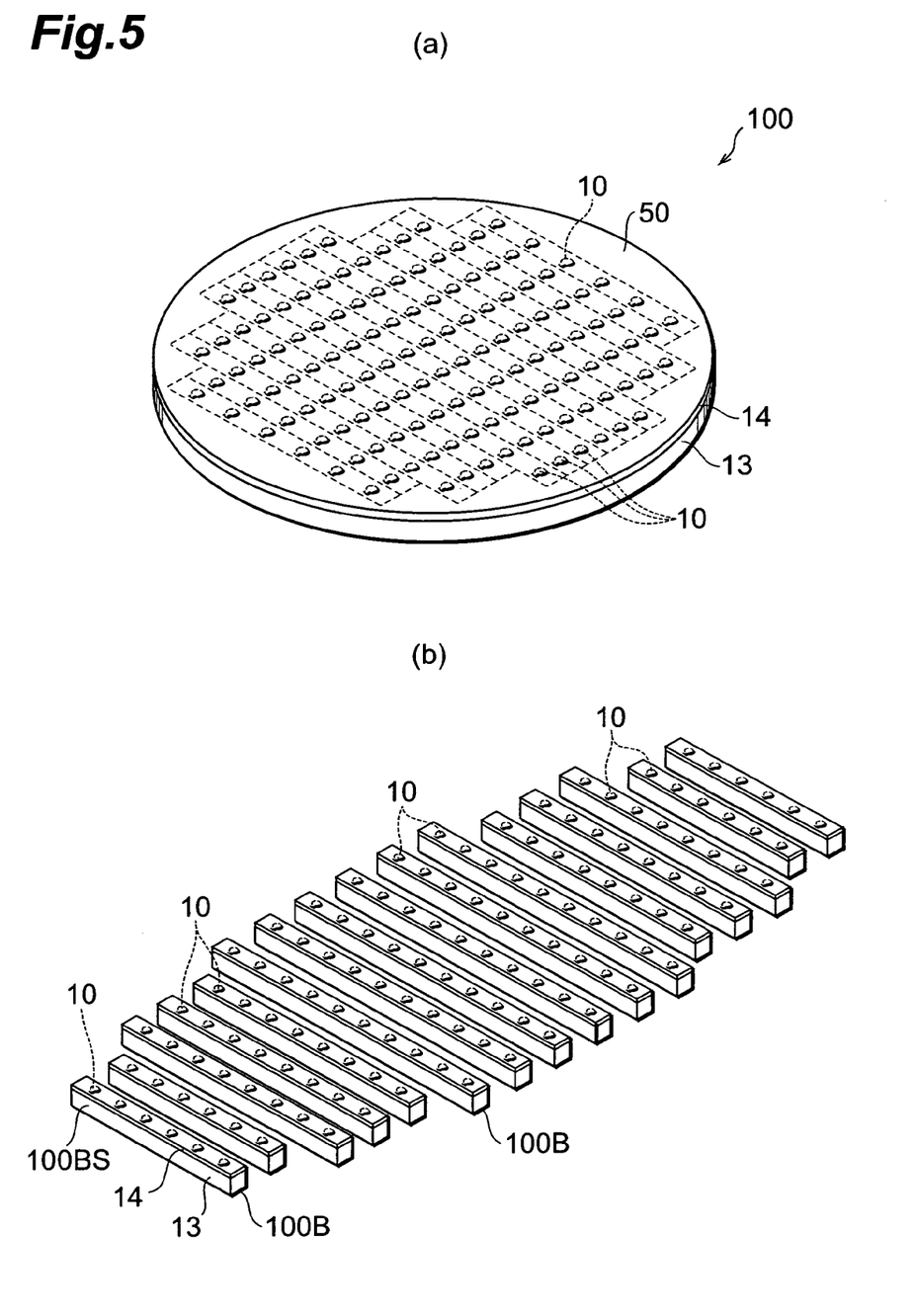

The first step is to prepare a substrate 13 formed in a disk wafer shape from the aforementioned magnetic head slider material, as shown in FIG. 4. Next, as shown in (a) of FIG. 5, a laminate 14 including thin-film magnetic heads 10 and coat layer 50 is laid on this substrate 13 by a well-known technique. The laminate 14 herein is formed so that a number of thin-film magnetic heads 10 are arrayed in a matrix in the laminate 14.

Subsequently, the substrate 13 with the laminate 14 thereon is cut in predetermined shape and size. In this example, for example, the substrate is cut as indicated by dashed lines in (a) of FIG. 5 to form bars 100B in such a structure that a plurality of thin-film magnetic heads 10 are arranged on a line and that these thin-film magnetic heads 10 are exposed each in a side face 100BS, as shown in (b) of FIG. 5.

Then a so-called lapping step is carried out to polish the side face 100BS of each bar 100B to form the air bearing surface S. In this lapping step, the substrate 13 and the laminate 14 made thereon are polished simultaneously and in the direction (the direction of arrow X in FIG. 3) crossing the stack direction.

In the present embodiment, the substrate 13 is made from the aforementioned material for the magnetic head slider according to the present invention. Therefore, the polishing rate of this substrate 13 becomes sufficiently higher than the polishing rate of the substrate made from the conventional AlTiC sintered body, and the polishing rate of this substrate 13 becomes approximately equal to the polishing rate of the laminate 14 incorporating the thin-film magnetic head 10.

Figure 6:
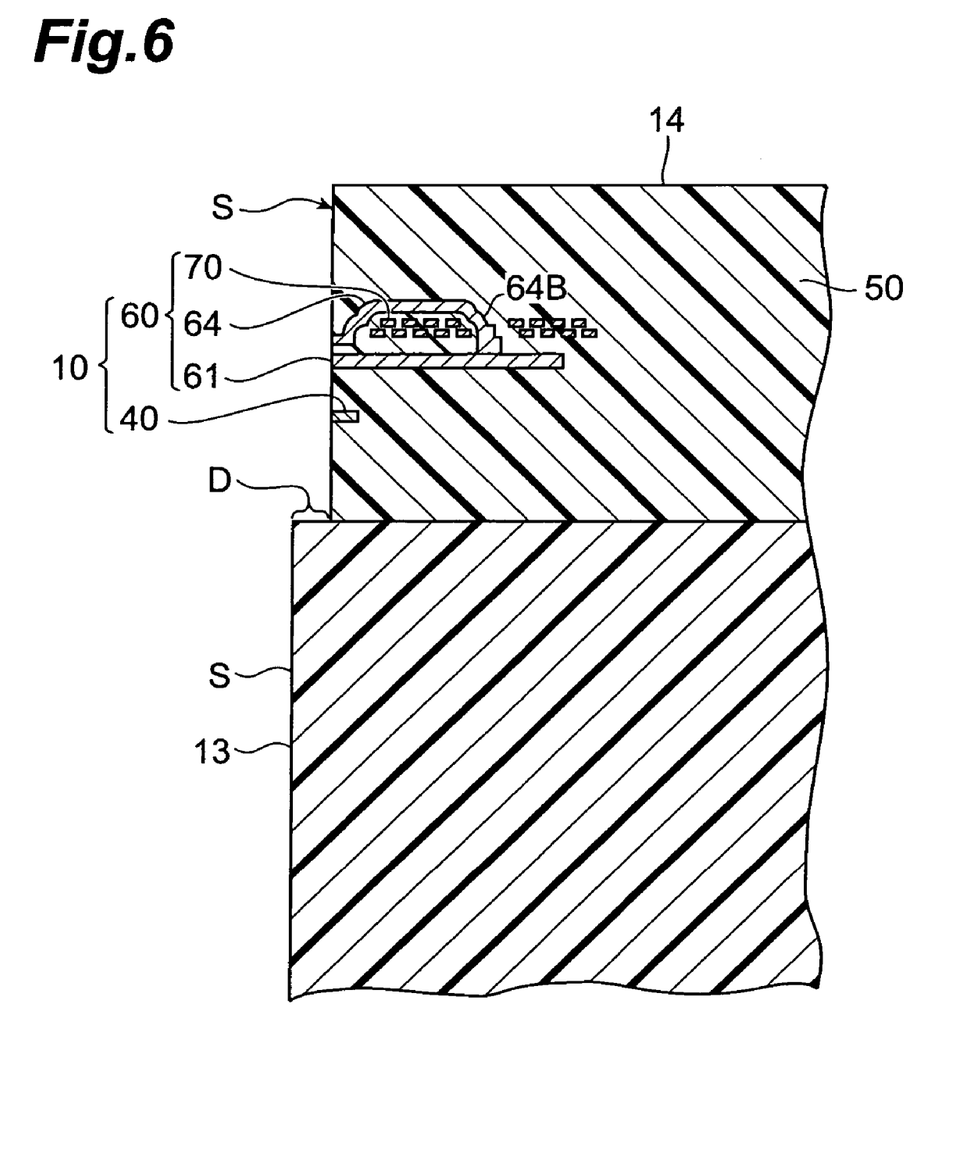
FIG. 6 is a sectional conceptual diagram showing a state in which a bar of (*b*) in FIG. 5 has been polished.

Therefore, after the lapping, the difference of polishing amounts between the laminate 14 and the substrate 13 is extremely small, so that the level difference D (cf. FIG. 6) between the laminate 14 and the substrate 13 becomes much smaller than before. This makes, for example, the air bearing surface S almost flat. Specifically, the level difference D can be made not more than 1.2 nm, for example.

Therefore, it becomes feasible to appropriately construct a femto slider or a slider in a size smaller than it, and it becomes easy to achieve recording in a higher density. Furthermore, the substrate 13 of the present embodiment also has sufficient strength and thus has satisfactory reliability.

EXAMPLES

The present invention will be described below in further detail with Examples and Comparative Examples, but it is noted that the present invention is by no means intended to be limited to these examples.

Example 1

First, the alumina powder (having the average grain size of 0.25 μm), the titanium carbide powder (having the average grain size of 0.3 μm and containing carbon 0.1% by mass), and the carbon powder (carbon black having the average grain size of 14 nm) were weighed by predetermined amounts to achieve the blending ratio shown in Table 1, they were pulverized with IPA (isopropyl alcohol; boiling point 82.4° C.) in a ball mill for 30 minutes, and thereafter they were spray-granulated at 150° C. in nitrogen to obtain granules. The amount of free carbon in Table 1 is a total value of an amount of carbon originating in the carbon powder and an amount of carbon originating in the titanium carbide powder.

Subsequently, the granules obtained were primarily shaped under about 0.5 MPa (50 kgf/cm$^2$). This formed body was baked in a vacuum atmosphere at the sintering temperature of 1680° C. and under the pressure of about 30 MPa (about 300 kgf/cm$^2$) for two hours by the hot press method to obtain the material for the magnetic head slider in Example 1. The temperature increase condition to the sintering temperature was the temperature increase rate of 20° C./min from ordinary temperature to 500° C. and the temperature increase rate of 10° C./min from 500° C. to the sintering temperature (1680° C.). The hot press machine used herein was the 200-ton hot press available from IHI Co., Ltd., and the shape of the formed body was a disk shape of diameter 154 mm×thickness 3 mm.

<Measurement of Average Crystal Grain Size of Alumina Crystal Grains and Titanium Carbide Crystal Grains>

Samples for observation with TEM were cut from five arbitrary portions of the material for the magnetic head slider obtained. A cut surface of each cut sample was observed with a scanning electron microscope "SS-550" (available from Shimadzu Corporation) and the average crystal grain size of alumina crystal grains and titanium carbide crystal grains was calculated by particle analysis software of SS-550. Furthermore, an average was determined among the samples at the five portions. Table 2 presents respective average crystal grain sizes (μm) of alumina crystal grains and titanium carbide crystal grains obtained.

<Area Percentage of Area of Alumina Crystal Grains and Titanium Carbide Crystal Grains>

Furthermore, an image of each cut surface observed with SS-550 was subjected to image processing to determine an area of alumina crystal grains and titanium carbide crystal grains having the equivalent circle particle diameter of less than 200 nm in the cut surface, an area of alumina crystal grains and titanium carbide crystal grains having the equivalent circle particle diameter of not less than 200 nm nor more than 350 nm in the cut surface, and an area of alumina crystal grains and titanium carbide crystal grains having the equivalent circle particle diameter of more than 350 nm in the cut surface. Then calculated was the area percentage (%) in each grain size range to the total area of alumina crystal grains and titanium carbide crystal grains in the cut surface. Furthermore, an average was calculated among the samples at the five portions. Table 2 presents the area percentages (%) in the respective grain size ranges obtained in this manner.

<Measurement of Polishing Rate>

The material for the magnetic head slider obtained was cut in a piece of approximately 20×20×1.8 mm to prepare a test piece. Then this test piece was polished using a slurry containing diamond particles of the diameter of 0.1 μm and using a single-side polisher. The polishing conditions herein were the rotation speed of a tin plate of 37.5 rotations per min, the load of 2550 g, the rotation speed of an oskar motor of 55 rotations per min, and the polishing time of 10 minutes. Thicknesses before and after the polishing were measured and a difference between the thicknesses was divided by the polishing time to acquire a polishing rate of the test piece. The polishing rate was normalized by the value of Comparative Example 1 below defined as 100, and was indicated by a symbol in Table 2 on the basis of the following criteria.

○: 150% or more to the value of Comparative Example 1

×: 100% or less to the value of Comparative Example 1

<Measurement of Deflecting Strength>

The deflecting strength of the test piece was measured under the conditions of JIS R1601 (1995), using a test machine available from Shimadzu Corporation. Table 2 presents the test result based on such criteria that symbol "○" indicates sufficient strength where the deflecting strength is not less than 400 MPa and that symbol "x" indicates insufficient strength where the deflecting strength is less than 400 MPa.

<Measurement of Electric Resistance>

The electric resistance of the test piece was measured based on JIS R1637 (1998). Table 2 shows the test result based on such criteria that symbol "○" indicates a sufficiently low electric resistance where the electric resistance is not more than $10^6$ Ω·cm and that symbol "x" indicates a too high electric resistance where the electric resistance is over $10^6$ Ω·cm.

TABLE 1

| | Blending Amounts of Raw Materials (Parts by Mass) | | | | Average Grain Size of Raw Materials (μm) | | Temperature Increase Rate from 500° C. to Sintering | |
|---|---|---|---|---|---|---|---|---|
| | Alumina | Titanium Carbide | Free Carbon | Titania | Alumina | Titanium Carbide | Temperature (° C./min) | Sintering Temperature |
| Example1 1 | 61.24 | 34.45 | 0.48 | 3.83 | 0.25 | 0.30 | 10 | 1680 |
| Example1 2 | 60.95 | 34.29 | 0.95 | 3.81 | 0.25 | 0.30 | 10 | 1680 |
| Example1 3 | 59.81 | 33.64 | 2.80 | 3.74 | 0.25 | 0.30 | 10 | 1680 |
| Example1 4 | 61.24 | 34.45 | 0.48 | 3.83 | 0.30 | 0.25 | 10 | 1680 |
| Example1 5 | 60.95 | 34.29 | 0.95 | 3.81 | 0.30 | 0.25 | 10 | 1680 |
| Example1 6 | 59.81 | 33.64 | 2.80 | 3.74 | 0.30 | 0.25 | 10 | 1680 |
| Example1 7 | 61.24 | 34.45 | 0.48 | 3.83 | 0.25 | 0.30 | 10 | 1650 |
| Example1 8 | 60.95 | 34.29 | 0.95 | 3.81 | 0.25 | 0.30 | 10 | 1650 |
| Example1 9 | 59.81 | 33.64 | 2.80 | 3.74 | 0.25 | 0.30 | 10 | 1650 |
| Example1 10 | 59.81 | 33.64 | 2.80 | 3.74 | 0.30 | 0.25 | 5 | 1680 |
| Comparative Example 1 | 61.52 | 34.60 | 0.03 | 3.84 | 0.25 | 0.30 | 10 | 1680 |
| Comparative Example 2 | 59.53 | 33.49 | 3.26 | 3.72 | 0.25 | 0.30 | 10 | 1680 |
| Comparative Example 3 | 61.24 | 34.45 | 0.48 | 3.83 | 0.25 | 0.30 | 2 | 1680 |
| Comparative Example 4 | 61.24 | 34.45 | 0.48 | 3.83 | 0.25 | 0.30 | 10 | 1600 |

TABLE 2

| | Sintered Body | | | | | | | |
|---|---|---|---|---|---|---|---|---|
| | Area Percentage (%) | | | Average Crystal Grain Size (μm) | | | | |
| | <200 nm | 200 nm incl–350 nm incl | 350 nm< | Alumina Crystal Grains | Titanium Carbide Crystal Grains | Polishing Rate | Deflecting Strength | Electric Resistance |
| Example1 1 | 7 | 85 | 8 | 0.25 | 0.31 | ○ | ○ | ○ |
| Example1 2 | 4 | 90 | 6 | 0.26 | 0.30 | ○ | ○ | ○ |
| Example1 3 | 8 | 82 | 10 | 0.25 | 0.32 | ○ | ○ | ○ |
| Example1 4 | 7 | 83 | 10 | 0.31 | 0.25 | ○ | ○ | ○ |
| Example1 5 | 6 | 88 | 6 | 0.31 | 0.26 | ○ | ○ | ○ |
| Example1 6 | 15 | 80 | 5 | 0.30 | 0.25 | ○ | ○ | ○ |
| Example1 7 | 10 | 82 | 8 | 0.26 | 0.31 | ○ | ○ | ○ |
| Example1 8 | 11 | 82 | 7 | 0.25 | 0.31 | ○ | ○ | ○ |
| Example1 9 | 12 | 81 | 7 | 0.25 | 0.30 | ○ | ○ | ○ |
| Example1 10 | 5 | 80 | 15 | 0.27 | 0.30 | ○ | ○ | ○ |
| Comparative Example 1 | 10 | 50 | 40 | 0.62 | 0.30 | x | ○ | ○ |
| Comparative Example 2 | 25 | 70 | 5 | 0.25 | 0.30 | x | x | ○ |
| Comparative Example 3 | 3 | 71 | 26 | 0.34 | 0.30 | x | ○ | ○ |
| Comparative Example 4 | 20 | 73 | 7 | 0.25 | 0.30 | x | ○ | ○ |

Example 2

The material for the magnetic head slider in Example 2 was made in the same manner as in Example 1 except that the blending amounts of the alumina powder, titanium carbide powder, and carbon powder were changed to those presented in Table 1. The material for the magnetic head slider obtained was evaluated in the same manner as in Example 1. The results are presented in Table 2.

Example 3

The material for the magnetic head slider in Example 3 was made in the same manner as in Example 1 except that the blending amounts of the alumina powder, titanium carbide powder, and carbon powder were changed to those presented in Table 1. The material for the magnetic head slider obtained was evaluated in the same manner as in Example 1. The results are presented in Table 2.

Example 4

The material for the magnetic head slider in Example 4 was made in the same manner as in Example 1 except that the alumina powder having the average grain size of 0.30 μm was used instead of the alumina powder having the average grain size of 0.25 μm and that the titanium carbide powder with the average grain size of 0.25 μm (containing carbon 0.1% by mass) was used instead of the titanium carbide powder with the average grain size of 0.30 μm (containing carbon 0.1% by mass). The material for the magnetic head slider obtained was evaluated in the same manner as in Example 1. The results are presented in Table 2.

Example 5

The material for the magnetic head slider in Example 5 was made in the same manner as in Example 2 except that the alumina powder having the average grain size of 0.30 μm was used instead of the alumina powder having the average grain size of 0.25 μm and that the titanium carbide powder with the average grain size of 0.25 μm (containing carbon 0.1% by mass) was used instead of the titanium carbide powder with the average grain size of 0.30 μm (containing carbon 0.1% by mass). The material for the magnetic head slider obtained was evaluated in the same manner as in Example 1. The results are presented in Table 2.

Example 6

The material for the magnetic head slider in Example 6 was made in the same manner as in Example 3 except that the alumina powder having the average grain size of 0.30 μm was used instead of the alumina powder having the average grain size of 0.25 μm and that the titanium carbide powder with the average grain size of 0.25 μm (containing carbon 0.1% by mass) was used instead of the titanium carbide powder with the average grain size of 0.30 μm (containing carbon 0.1% by mass). The material for the magnetic head slider obtained was evaluated in the same manner as in Example 1. The results are presented in Table 2.

Example 7

The material for the magnetic head slider in Example 7 was made in the same manner as in Example 1 except that the sintering temperature in Example 1 was changed to 1650° C. The material for the magnetic head slider obtained was evaluated in the same manner as in Example 1. The results are presented in Table 2.

Example 8

The material for the magnetic head slider in Example 8 was made in the same manner as in Example 2 except that the sintering temperature in Example 2 was changed to 1650° C. The material for the magnetic head slider obtained was evaluated in the same manner as in Example 1. The results are presented in Table 2.

Example 9

The material for the magnetic head slider in Example 9 was made in the same manner as in Example 3 except that the sintering temperature in Example 3 was changed to 1650° C. The material for the magnetic head slider obtained was evaluated in the same manner as in Example 1. The results are presented in Table 2.

Example 10

The material for the magnetic head slider in Example 10 was made in the same manner as in Example 6 except that that the temperature increase rate from 500° C. to the sintering temperature (1680° C.) in Example 1 was changed to 5° C./min. The material for the magnetic head slider obtained was evaluated in the same manner as in Example 1. The results are presented in Table 2.

Comparative Example 1

The material for the magnetic head slider in Comparative Example 1 was made in the same manner as in Example 1 except that the blending amounts of the alumina powder, titanium carbide powder, and carbon powder were changed to those presented in Table 1. The material for the magnetic head slider obtained was evaluated in the same manner as in Example 1. The results are presented in Table 2.

Comparative Example 2

The material for the magnetic head slider in Comparative Example 2 was made in the same manner as in Example 1 except that the blending amounts of the alumina powder, titanium carbide powder, and carbon powder were changed to those presented in Table 1. The material for the magnetic head slider obtained was evaluated in the same manner as in Example 1. The results are presented in Table 2.

Comparative Example 3

The material for the magnetic head slider in Comparative Example 3 was made in the same manner as in Example 1 except that the temperature increase rate from 500° C. to the sintering temperature (1680° C.) in Example 1 was changed to 2° C./min. The material for the magnetic head slider obtained was evaluated in the same manner as in Example 1. The results are presented in Table 2.

Comparative Example 4

The material for the magnetic head slider in Comparative Example 4 was made in the same manner as in Example 1 except that the sintering temperature in Example 1 was changed to 1600° C. The material for the magnetic head slider obtained was evaluated in the same manner as in Example 1. The results are presented in Table 2.

As apparent from Table 2, it was confirmed that the magnetic head slider materials of Examples 1 to 10 had the sufficiently high deflecting strength and achieved the sufficiently high polishing rate. It was also confirmed that the substrates of the magnetic head slider materials of Examples 1 to 10 had the electric resistance below $10^6$ Ω·cm ($10^9$ mΩ·cm). On the other hand, the magnetic head slider materials of Comparative Examples 1 to 4 failed to achieve a sufficiently high polishing rate.

[Effects of the Invention]

The present invention successfully substantializes the magnetic head slider having the sufficient strength and reduced level difference of the air bearing surface. This permits production of the magnetic head slider in smaller size and enables achievement of higher density.

What is claimed is:

1. A material for a magnetic head slider, comprising a sintered body containing alumina and titanium carbide,
    wherein an area percentage of an area of alumina crystal grains and titanium carbide crystal grains having a crystal grain size of not less than 200 nm nor more than 350 nm to an area of alumina crystal grains and titanium carbide crystal grains in a cut surface of the sintered body is not less than 80%.

2. The material according to claim 1, wherein the sintered body further contains carbon.

3. The material according to claim 2, wherein a content of the carbon is 0.4-3.0 parts by mass, where a total mass of the alumina, titanium carbide, and carbon is 100 parts by mass.

4. The material according to claim 2, wherein the sintered body has a thin film containing carbon, at a grain boundary between the alumina crystal grains.

5. The material according to claim 1, wherein the sintered body further contains titania.

6. A magnetic head slider comprising: a substrate made from the material according to claim 1; and a laminate formed on the substrate and incorporating a thin-film magnetic head.

* * * * *